United States Patent
Machani

(10) Patent No.: US 9,621,344 B2
(45) Date of Patent: Apr. 11, 2017

(54) METHOD AND SYSTEM FOR RECOVERING A SECURITY CREDENTIAL

(75) Inventor: Salah Machani, Thornhill (CA)

(73) Assignee: IMS HEALTH INC., Danbury, CT (US)

( * ) Notice: Subject to any disclaimer, the term of this patent is extended or adjusted under 35 U.S.C. 154(b) by 474 days.

(21) Appl. No.: 13/081,704

(22) Filed: Apr. 7, 2011

(65) Prior Publication Data

US 2011/0302406 A1  Dec. 8, 2011

(30) Foreign Application Priority Data

Apr. 19, 2010  (CA) .................................... 2701061

(51) Int. Cl.
*H04L 29/06* (2006.01)
*H04L 9/08* (2006.01)

(52) U.S. Cl.
CPC .... H04L 9/0897 (2013.01); G06F 2221/2131 (2013.01); H04L 63/0428 (2013.01)

(58) Field of Classification Search
CPC ................. H04L 9/0894; H04L 9/0897; G06F 2221/2131
USPC ...................................................... 713/150
See application file for complete search history.

(56) References Cited

U.S. PATENT DOCUMENTS

| | | | |
|---|---|---|---|
| 6,360,322 B1 * | 3/2002 | Grawrock ..................... | 713/176 |
| 6,668,323 B1 * | 12/2003 | Challener et al. ............ | 713/183 |
| 6,920,563 B2 * | 7/2005 | Kohl ..................... | H04L 9/0894 |
| | | | 380/277 |
| 6,986,041 B2 * | 1/2006 | Gilfix et al. ................... | 713/161 |
| 7,451,147 B1 * | 11/2008 | Kao et al. ..................... | 713/187 |
| 2005/0086500 A1 * | 4/2005 | Albornoz ....................... | 713/188 |
| 2006/0242415 A1 * | 10/2006 | Gaylor .......................... | 713/176 |
| 2007/0230704 A1 * | 10/2007 | Youn ....................... | H04L 63/06 |
| | | | 380/277 |
| 2007/0255943 A1 * | 11/2007 | Kern et al. ..................... | 713/155 |
| 2007/0297610 A1 * | 12/2007 | Chen et al. .................... | 380/270 |
| 2008/0168544 A1 * | 7/2008 | von Krogh ....................... | 726/6 |
| 2009/0034733 A1 * | 2/2009 | Raman et al. ................. | 380/277 |
| 2011/0296521 A1 * | 12/2011 | Bernabeu ......................... | 726/19 |

OTHER PUBLICATIONS

Password-Based Key Derivation Function 2 (PBKDF2) a JavaScript implementation Parvez Anandam Crawled by Wayback Machine on Feb. 11 2007.*

* cited by examiner

*Primary Examiner* — Dede Zecher
*Assistant Examiner* — Vadim Savenkov
(74) *Attorney, Agent, or Firm* — Maldjian Law Group LLC

(57) ABSTRACT

A system and method for recovering a security credential is provided. A security credential stored in the storage of a computing device is encrypted using a first encryption key generated by a server. A first decryption key for decrypting the security credential and a second encryption key for re-encrypting the security credential are received. The first decryption key and the second encryption key are generated by the server. The security credential is decrypted using the first decryption key. The security credential is communicated to a user of the computing device. The security credential is re-encrypted in the storage of the computing device using the second encryption key.

18 Claims, 5 Drawing Sheets

METHOD AND SYSTEM FOR RECOVERING A SECURITY CREDENTIAL

FIELD OF THE INVENTION

The present invention relates generally to computer security. More particularly, the present invention relates to a method and system for recovering a security credential.

BACKGROUND OF THE INVENTION

The user of security credentials to access data and/or functionality on a computing device is known. The security credentials can take the form of a password, a personal identification number, a token, etc. In order to access the data and/or functionality, a user provides the security credentials to authenticate that the user is, in fact, the person that is authorized to access the data and/or functionality.

Some applications request that a user select one or more security credentials and then control access to data and/or functionality upon subsequent presentation of those security credentials. These applications theoretically provide more protection of the data and/or functionality as the credentials are not stored elsewhere, but bear the risk that, if those security credentials are forgotten, access to the data and/or functionality may be unrecoverable. In many cases, security credentials must be entered to access the operating system of a computing device. When this security credential is forgotten, most, if not all, functionality and/or data on the computing device may be very difficult and/or expensive to recover.

It is an object of this invention to provide a novel method and system for recovering a security credential.

SUMMARY OF THE INVENTION

In an aspect of the invention, there is provided a method for recovering a security credential, comprising:

encrypting a security credential stored in storage of a computing device using a first encryption key generated by a server;

receiving a first decryption key for decrypting said security credential, and a second encryption key for re-encrypting said security credential, said first decryption key and said second encryption key being generated by said server;

decrypting said security credential using said first decryption key;

communicating said security credential to a user of said computing device; and re-encrypting said security credential in said storage of said computing device using said second encryption key.

The method can further include:

controlling access to sensitive data on said computing device by requiring entry of said security credential.

The security credential can be a password.

The method can further include:

requiring a user of said computing device to change said security credential after said communicating; and modifying said access to said sensitive data by requiring entry of said changed security credential, and wherein said changed security credential is encrypted during said re-encrypting.

The security credential can be used to encrypt the sensitive data.

The first encryption key and the first decryption key can be asymmetric keys.

The second encryption key can differ from the first encryption key.

The first decryption key and the second encryption key can be communicated to the user, and the receiving can include receiving the first decryption key and the second encryption key via user entry.

The encrypting and decrypting can be performed by an encryption module on the computing device, and the receiving can include automatically receiving, by the encryption module on the mobile device, the first decryption key and the second encryption key from the server.

In accordance with another aspect of the invention, there is provided a system for recovering a security credential, comprising:

a computing device;

an application executing on a processor of said computing device and providing access, upon entry of a security credential, to one of sensitive information stored in storage of said computing device and sensitive functionality; and an encryption module storing, in said memory, said security credential encrypted using a first encryption key, said encryption module decrypting said security credential using a first decryption key upon receipt of said first decryption key and a second encryption key, communicating said security credential to a user of said computing device, and encrypting said security credential stored in said storage of said computing device using said second encryption key.

The application can control access to sensitive data on the computing device by requiring provision of the security credential. The security credential can be a password.

The encryption module can require that a user of the computing device change the security credential before encrypting the security credential using the second encryption key.

The encryption module can encrypt the sensitive data using the security credential.

The first encryption key and the first decryption key can be asymmetric keys.

The second encryption key can differ from the first encryption key.

The encryption module can receive the first decryption key and the second encryption key from the user.

The encryption module can receive the first decryption key and the second encryption key from a server and automatically decrypt the security credential.

In accordance with a further aspect of the invention, there is provided a method for recovering a security credential, comprising:

encrypting a security credential stored in storage of a computing device using a first encryption key;

receiving a first password for deriving a first decryption key for decrypting said security credential, and a second password for deriving a second encryption key for re-encrypting said security credential;

decrypting said security credential using said first decryption key;

communicating said security credential to a user of said computing device; and re-encrypting said security credential in said storage of said computing device using said second encryption key.

BRIEF DESCRIPTION OF THE DRAWINGS

An embodiment will now be described, by way of example only, with reference to the attached Figures, wherein.

DETAILED DESCRIPTION OF THE EMBODIMENT

The invention provides a system and method for recovering a security credential. The security credential is any type of string of characters established for a user for protecting access to functionality and/or data on a computing device. An example of such a security credential would be an offline/local password. The security credential is encrypted using an encryption key provided by a server and stored on the computing device. When the security credential is forgotten by the user, the user can request a decryption key for decrypting the security credential from a service. The server generates a new encryption key and transmits the decryption key and the new encryption key to the computing device. The encrypted security credential can then be decrypted to recover the security credential, after which the security credential is re-encrypted using the new encryption key provided by the server. As the security credential is stored on and not transmitted by the computing device, the vulnerability of the functionality and/or data protected by the security credential is reduced.

Figure 1:
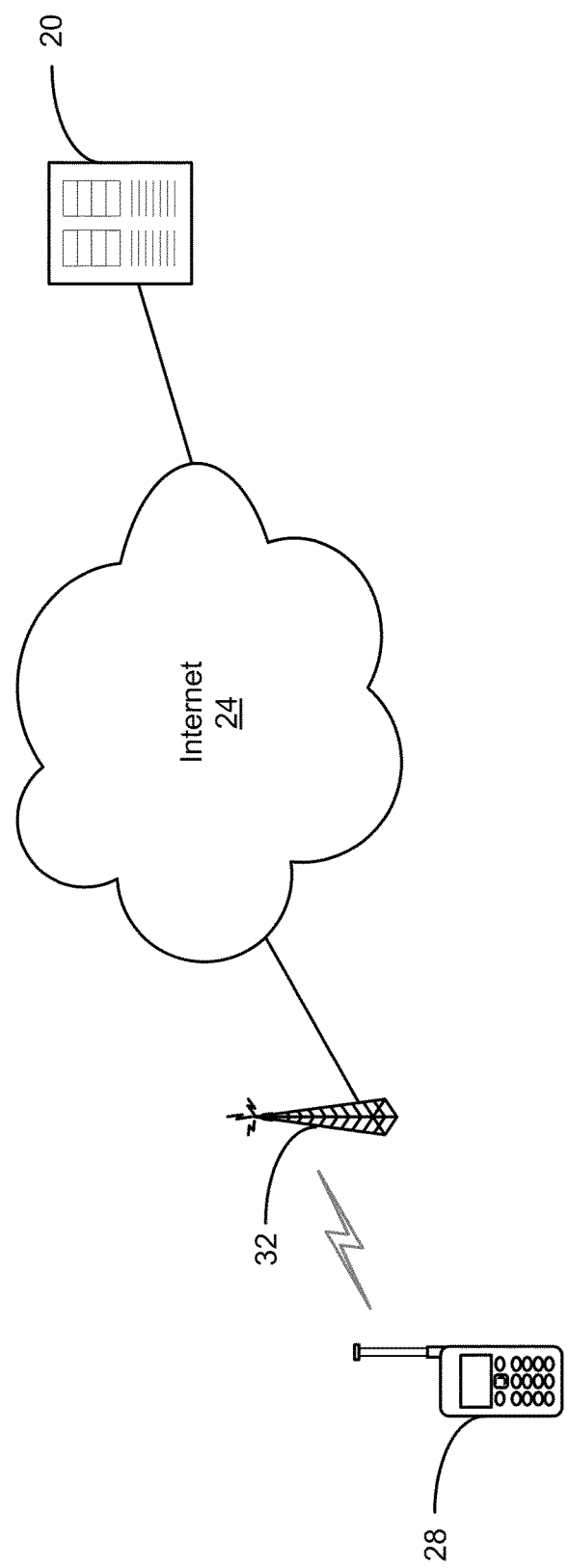
FIG. 1 shows a high-level architecture of a system for recovering a security credential in accordance with an embodiment of the invention and its operating environment.

FIG. 1 is a high-level architectural diagram of a system for recovering a security credential and its operating environment in accordance with an embodiment of the invention. In the illustrated embodiment, the security credential protects access to data managed by an application on a mobile device. The data in this case is any type of data that the user of the mobile device desires to maintain confidentially. An example of such an application and data is a wallet application that stores personal and banking information, including account information, and protects access to them via a security credential that is a string of numeric characters, referred to as a personal identification number ("PIN"). The personal and banking information stored by the wallet application may or may not be additionally stored elsewhere. As a result, it can be desirable to ensure that access to the data stored on the mobile device by the wallet application is not lost when the PIN is forgotten.

As shown in FIG. 1, the system includes a server 20 that generates encryption and decryption keys, and stores the decryption keys in a key database. While only one server 20 is shown, it will be appreciated by those skilled in the art that the functionality/service provided by the server 20 in the described embodiment can be provided by two or more server computers. Where there is more than one server, the servers can be in communication with one another over a local area network, or can be distributed remotely and in communication with each other via one or more communication networks.

The server 20 is in communication with a large, public network, such as the Internet 24. A mobile device 28 is also in communication with the Internet 24 via a cellular communications tower 32. In particular, the mobile device 28 communicates via cellular communications with the cellular communications tower 32 that, in turn, is in communication with the Internet 24 via a number of intermediate servers operated by one or more cellular communications carriers (not shown).

Figure 2:
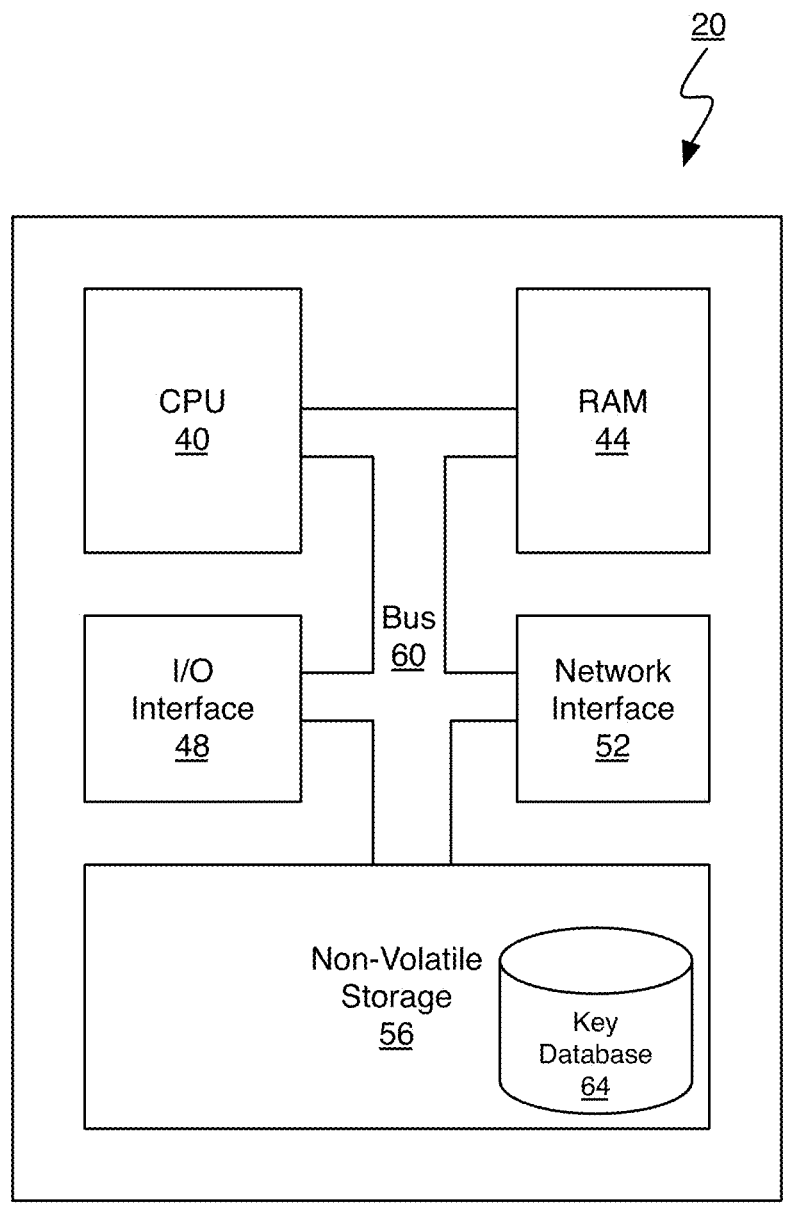
FIG. 2 shows a schematic diagram of the server of FIG. 1.

FIG. 2 shows a number of physical and logical components of the server 20, including a central processing unit ("CPU") 40, random access memory ("RAM") 44, an input/output ("I/O") interface 48, a network interface 52, non-volatile storage 56, and a local bus 60 enabling the CPU 40 to communicate with the other components. The CPU 40 executes an operating system and programs that provide the desired functionality. RAM 44 provides relatively responsive volatile storage to the CPU 40. The I/O interface 48 allows for input to be received from one or more devices, such as a keyboard, a mouse, etc., and outputs information such as to a display and/or speakers. The network interface 52 permits communication with other systems for sending and receiving communications to the mobile device 28 and email. Non-volatile storage 56 stores the operating system and applications. A key database 64 is maintained by the server 20 in the non-volatile storage and stores user account information, mobile device information and decryption keys associated with user accounts. The server 20 includes a Web interface for enabling users to register with the server 20, and to request assistance in recovering a forgotten PIN. Further, the server 20 includes various installation versions of one or more applications for installation on the mobile device 28. The versions enable installation of the application on various types of mobile device with varying versions of operating systems.

Figure 3:
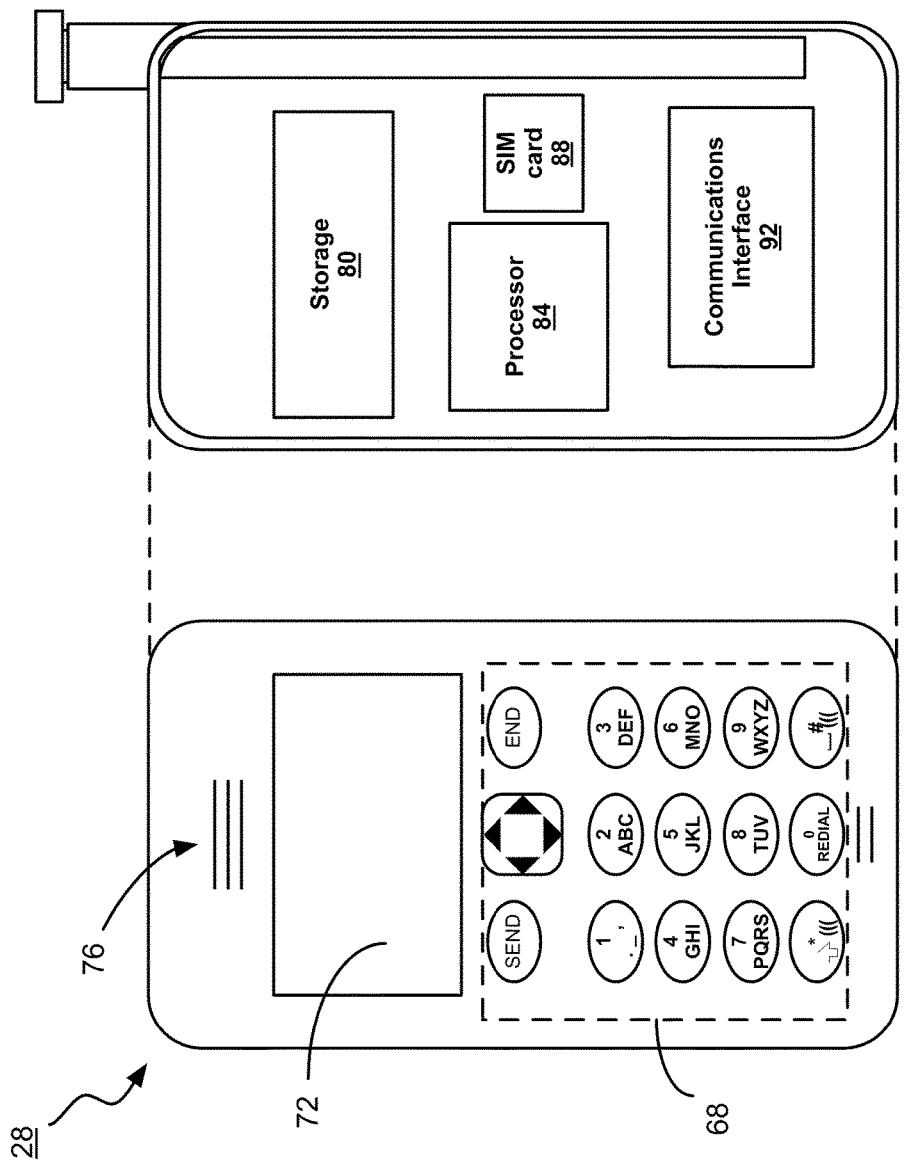
FIG. 3 shows a schematic diagram of the mobile device of FIG. 1.

Referring to FIG. 3, a number of components of the mobile device 28 are shown. Mobile devices are ubiquitous today. Many people have even cancelled traditional landline telephone services at their residences and/or businesses, and have adopted mobile phones as their primary means of communications. Accordingly, many people typically carry such mobile devices with them wherever they go. For purposes of the discussion hereinbelow, mobile devices include mobile telephones, personal digital assistants, and other portable computing devices that have an input interface such as a keypad or keyboard, and an output interface such as a display. Mobile devices can include a subscriber identification module ("SIM") card that can provide additional capabilities and/or capacity. The capabilities of such mobile devices have increased with increases in their processing power, memory, screen size, etc.

As illustrated in FIG. 3, in this embodiment, the mobile device 28 is a typical mobile phone having basic functions. The mobile device 28 has an input interface 68 for receiving input from a user, a display 72 is provided for presenting information visually to the user, and a speaker 76 for playing audio notifications or other audio output, including voice output, to the user. The mobile device 28 also includes storage 80 for storing an operating system that controls the main functionality of the mobile device 28, along with a number of applications that are run on the mobile device 28, and data. A processor 84 executes the operating system and applications. A SIM card 88 provides additional memory for storing applications and data, and has a microprocessor for executing them. Additionally, the SIM card 88 has a unique hardware identification code that permits identification of the mobile device 28. When installed, the SIM card 88 forms part of the mobile device 28. Other types of mobile devices can have encrypted device memory in place of the SIM card 88 that offers the equivalent functionality. A communications interface 92 permits communications with a cellular network for voice and data. The communications interface 92 also enables communications via other wireless and wired channels, such as Bluetooth and universal serial bus ("USB").

The mobile device 28 executes an application for controlling access to data and/or functionality. The application is stored in the storage 80 of the mobile device 28 and executed by the processor 84. A set of data is accessible via the application after authentication of the user via the entry of the PIN. The data is encrypted by an encryption module of the application using the PIN. In addition, the encryption module of the application encrypts and separately stores the user PIN as will be described below. The encryption module can form part of the application or can be separate.

Figure 4:
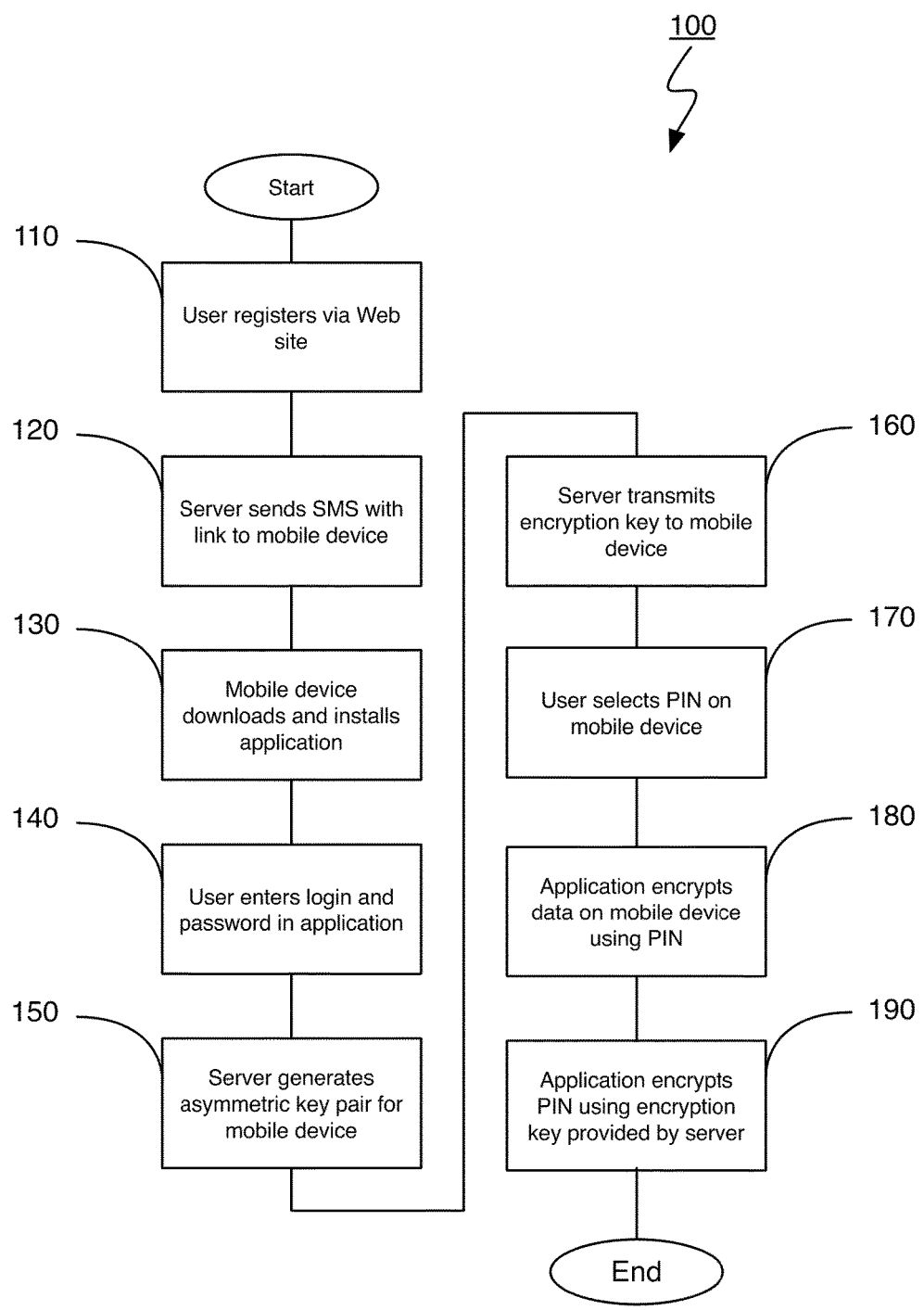
FIG. 4 shows the method of setting up the mobile device for use with the system of FIG. 1.

FIG. 4 shows the general method 100 of setting up the mobile device 28 for use with the server 20. In order to use the system, the user of the mobile device 28 registers with the server 20 via a Web page, either on the mobile device 28 or elsewhere (step 110). The Web page is part of a registration and administration interface for the security credential recovery service that is Web-based. During registration, the user provides his name, a login name and password, and the telephone number associated with the mobile device 28 that he wishes to use the application on. In addition, the user is asked to accept an end-user license agreement ("EULA") and privacy policy for the security credential recovery service. Once registration is complete, the server 20 sends a short message service ("SMS") message to the mobile device 28 that includes a link for downloading an application (step 120). The SMS message is sent to the mobile device 28 via the telephone number provided by the user at step 110. Upon receipt of the SMS message and activation of the link, the mobile device 28 downloads the application, after which it is installed on the mobile device 28 (step 130). The server 20 receives the download request, determines the type of mobile device in order to deliver an appropriate version of the application to the mobile device 28.

Once the application is installed on the mobile device 28 and started up for the first time, the user is prompted for his login name and password (step 140). The application transmits the user's login name and password securely to the server 20 and, once approved, the server 20 generates an asymmetric key pair for the mobile device 28 (step 150). The asymmetric key pair is generated using an asymmetric key algorithm, where a public key used to encrypt something is not the same as the corresponding private key in the pair used to decrypt it. Security credentials are encrypted with an encryption key, in this case, the public key, and can only be decrypted with the decryption key, the corresponding private key. The keys are related mathematically, but the private key cannot be feasibly (i.e., in actual or projected practice) derived from the public key. The server 20 stores the decryption key in the key database, together with the other user information.

The server 20 then transmits the encryption key to the mobile device 28 (step 160). The encryption key is sent via a secure data communication between the server 20 and the mobile device 28. Upon receipt of the encryption key, the application executing on the mobile device 28 requests the user to select a PIN (step 170). Upon entry of the PIN by the user, he is asked to confirm his PIN by re-entering it. After confirmation of the user's PIN, the application encrypts the data stored using the PIN (step 180). In particular, the application takes the PIN and a server-generated salt to derive an application-specific encryption/decryption key for the data that is generally not related to the encryption and decryption keys used to encrypt and decrypt the PIN. Additionally, the application encrypts the user's PIN using the encryption key provided by the server 20 (step 190).

During regular operation, the user starts up the application and enters in his PIN. The application uses the PIN, if correct, to decrypt the secure data stored by the application. The PIN is cached temporarily and securely during use of the application so that the data stored by the application can be re-encrypted upon changes being made to it.

Figure 5:
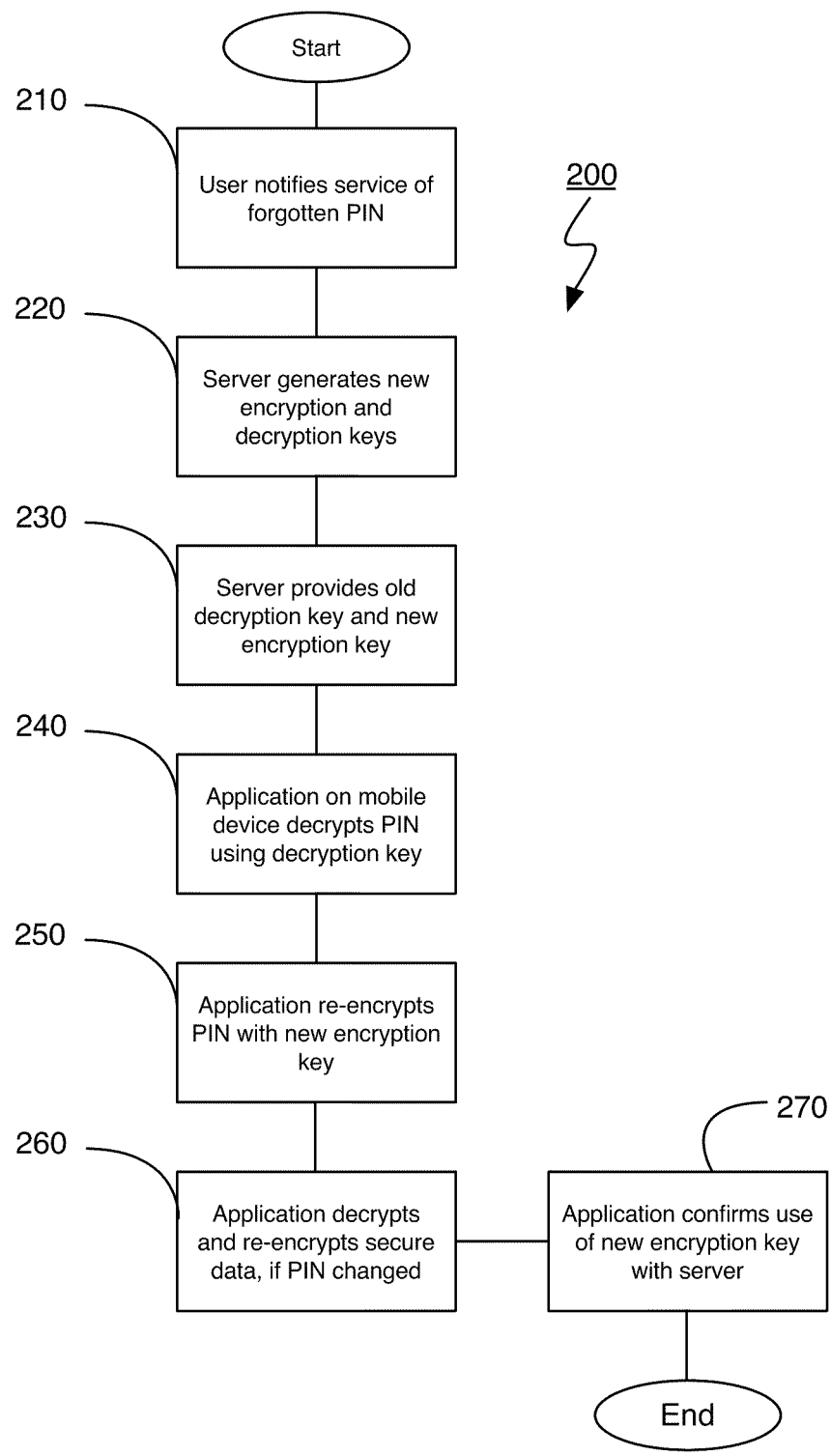
FIG. 5 shows the general method of recovering a security credential using the system of FIG. 1.

FIG. 5 illustrates the method for recovering a security credential using the system shown in FIG. 1 generally at 200. The method begins when the user notifies the service of the forgotten PIN (step 210). In particular, the user connects the administration Web interface and enters in his login name and password, or the user simply enters in the telephone number associated with his mobile device 28. If the user enters in his telephone number, the user is queried via a set of challenge/response questions to authenticate the user. The challenge/response questions and answers are established during registration of the user.

Upon notifying the service of the forgotten PIN, the server 20 generates a new asymmetric key pair (step 220). As the server 20 will communicate the decryption key to enable decryption of the PIN stored on the mobile device 28, the server 20 generates a new encryption key for encrypting the user's PIN on the mobile device 28 so that anyone that intercepted the message cannot subsequently use the same decryption key to decrypt the newly-encrypted PIN on the mobile device 28. The server 20 also generates the corresponding decryption key and stores it in the key database 64.

Once the new encryption and decryption keys are generated, the server 20 provides the decryption key for decrypting the PIN on the mobile device, and a new encryption key (step 230). In particular, the decryption key corresponds to the encryption key previously used to encrypt the PIN on the mobile device 28. The server 20 transmits the decryption key and the new encryption key via a secure socket layer ("SSL") data communication.

Upon receiving the decryption key and new encryption key, the application decrypts the PIN and presents it to the user via an additional screen, with the option to change the PIN (step 240). Upon selecting to keep the same PIN or change the PIN and confirming it, the application re-encrypts the PIN with the new encryption key (step 250). If the user elected to change the PIN, the application then decrypts the secure data stored by the application using the old PIN and re-encrypts the secure data using the new PIN (step 260). Then, the application sends a confirmation message to the server 20 to confirm that the newly-received encryption key has been used (270). The server 20 notes the confirmation in the key database 64. Upon sending the confirmation message, the method 200 is complete.

While the invention has been described with specificity to recovering security credentials on a mobile device, those skilled in the art will appreciate that the invention can also be applied to other types of computing devices. For example, the method can be used to recover security credentials stored on personal computers, security elements, smart cards, media cards, etc.

In an alternative embodiment, the user voice calls the service to obtain a decryption key and new encryption key for re-encrypting the security credential. The information can be communicated via an interactive voice recognition system. Alternatively, the user can speak to a live customer representative, who can provide him the same information verbally, send it in an email, etc.

While the above embodiment was described with respect to asymmetric keys for encrypting and decrypting the security credential(s), those skilled in the art will appreciate that symmetric keys can also be used. Although asymmetric keys provide the desirable effect that any data communicated to the computing device to encrypt or decrypt the security credential(s) will generally be useless in accessing the security credential(s) and/or protected data/functionality, it can be advantageous in some scenarios to use symmetric keys which require less computational power. Alternatively, two separate passwords can be provided by the server or service, one being used to derive a decryption key and another for deriving a new encryption key.

The server can send a communication to the mobile device with the decryption key and a subsequent encryption key via one of many methods. For example, a secure data connection such as a secure socket layer ("SSL") connection can be employed. Alternatively, various server push methods can be used, such as SMS or email. Where passwords are being used to derive encryption keys, the passwords can be communicated to a user of the computing device via voice, a web page, an SMS, etc.

A dedicated application can be responsible for encrypting and decrypting the security credentials.

The security credentials can be used to access functions and/or data that are controlled via an operating system or other access-control system.

The application on the computing device can include a listener to enable automatic handling of a communication for recovering security credentials from the server.

The above-described embodiments are intended to be examples of the present invention and alterations and modifications may be effected thereto, by those of skill in the art, without departing from the scope of the invention, which is defined solely by the claims appended hereto.

What is claimed is:

1. A method for recovering a security credential, comprising:
    encrypting, by a computing device, a security credential stored in storage of the computing device using a first encryption key generated by a server, wherein the security credential is not transmitted between the computing device and said server;
    controlling access to sensitive data on said computing device by requiring entry of said security credential;
    receiving, by the computing device, a request to recover a forgotten security credential;
    generating a request to the server for a first decryption key and a second encryption key in order to recover the forgotten security credential;
    receiving by said computing device the first decryption key for decrypting said security credential, and the second encryption key for re-encrypting said security credential, said first decryption key and said second encryption key being generated by said server;
    decrypting said security credential using said first decryption key;
    communicating said security credential to a user of said computing device; and
    re-encrypting said security credential in said storage of said computing device using said second encryption key.

2. The method of claim 1, wherein said security credential is a password.

3. The method of claim 1, further comprising: requiring a user of said computing device to change said security credential after said communicating; and modifying said access to said sensitive data by requiring entry of said changed security credential, and wherein said changed security credential is encrypted during said re-encrypting.

4. The method of claim 1, wherein said security credential is used to encrypt said sensitive data.

5. The method of claim 1, wherein said first encryption key and said first decryption key are asymmetric keys.

6. The method of claim 1, wherein said second encryption key differs from said first encryption key.

7. The method of claim 1, wherein said first decryption key and said second encryption key are communicated to said user, and said receiving comprises receiving said first decryption key and said second encryption key via user entry.

8. The method of claim 1, wherein said encrypting and decrypting are performed by said computing device, and wherein said receiving comprises automatically receiving, by said computing device, said first decryption key and said second encryption key from said server.

9. A system for recovering a security credential, comprising:
    a computing device;
    an application executing on a processor of said computing device and providing access, upon entry of a security credential, to one of sensitive information stored in memory of said computing device and sensitive functionality; and
    a server configured to:
        generate a first encryption key; and
        transmit said first encryption key to said computing device;
    wherein the computing device is configured to:
        encrypt said security credential using said first encryption key received from said server, wherein the security credential is not transmitted between the computing device and the server;
        store, in said memory, said encrypted security credential;
        receive a request to recover a forgotten security credential;
        generate a request to the server for a first decryption key and a second encryption key in order to recover the forgotten security credential;
        receive the first decryption key and the second encryption key from said server;
        decrypt said security credential using the first decryption key;
        communicate said security credential to a user of said computing device; and
        re-encrypt said security credential stored in said memory of said computing device using said second encryption key.

10. The system of claim 9, wherein said application controls access to sensitive data on said computing device by requiring provision of said security credential.

11. The system of claim 10, wherein said security credential is a password.

12. The system of claim 10, wherein said computing device requires that a user of said computing device change said security credential before encrypting said security credential using said second encryption key.

13. The system of claim 10, wherein said computing device encrypts said sensitive data using said security credential.

14. The system of claim 10, wherein said first encryption key and said first decryption key are asymmetric keys.

15. The system of claim 10, wherein said second encryption key differs from said first encryption key.

16. The system of claim 10, wherein said computing device receives said first decryption key and said second encryption key from said user.

17. The system of claim 10, wherein said computing device receives said first decryption key and said second encryption key from said server and automatically decrypts said security credential.

18. A method for recovering a security credential, comprising:
- encrypting, by a computing device, a security credential stored in storage of the computing device using a first encryption key generated by a server, wherein the security credential is not transmitted between the computing device and said server;
- controlling access to sensitive data on said computing device by requiring entry of said security credential;
- receiving, by the computing device, a request to recover a forgotten security credential;
- generating a request to the server for a first password and a second password in order to recover the forgotten security credential;
- receiving the first password for deriving a first decryption key for decrypting said security credential, and the second password for deriving a second encryption key for re-encrypting said security credential;
- decrypting said security credential using said first decryption key;
- communicating said security credential to a user of said computing device; and
- re-encrypting said security credential in said storage of said computing device using said second encryption key.

* * * * *

UNITED STATES PATENT AND TRADEMARK OFFICE
CERTIFICATE OF CORRECTION

PATENT NO. : 9,621,344 B2  
APPLICATION NO. : 13/081704  
DATED : April 11, 2017  
INVENTOR(S) : Machani Page 1 of 1

It is certified that error appears in the above-identified patent and that said Letters Patent is hereby corrected as shown below:

On the Title Page

Column 2, in "Primary Examiner", Line 1, delete "Dede" and insert -- Cordelia --, therefor.

In the Specification

In Column 3, Line 14, delete "EMBODIMENT" and insert -- EMBODIMENTS --, therefor.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*